Patented Sept. 19, 1933

1,927,814

UNITED STATES PATENT OFFICE 1,927,814

PROCESS OF OBTAINING BUTYL ALCOHOL AND ACETONE BY FERMENTATION

David Alliston Legg, Terre Haute, Ind., assignor to Commercial Solvents Corporation, Terre Haute, Ind., a corporation of Maryland No Drawing. Application November 26, 1928
Serial No. 322,098

11 Claims. (Cl. 260—135)

My invention relates to an improved method of fermentation. More particularly, it relates to a method of obtaining improved yields of n-butyl alcohol, acetone and other products by using as the raw material, grain, such as maize which has previously been subjected to a soaking or steeping process.

In the past it has been the custom to carry out the butyl-acetonic fermentation somewhat as follows: Cereals such as maize, kaffir corn, wheat, oats, etc., have been ground to a fairly coarse meal and the bran removed. In the case of maize, it is the custom also to remove the germ during this stage of the treatment. Sufficient of this meal is then added to water to give a concentration of approximately 7% by weight and the resulting mash subjected to a suitable cooking for the purpose of thoroughly sterilizing the material and at the same time breaking down the starch particles into a form more easily acted upon by micro-organisms. The sterile mash thus obtained is cooled to approximately 97° F., inoculated with a culture of butyl alcohol-acetone organism and allowed to ferment. At the end of the fermentation, the products formed may be separated and recovered by fractional distillation or other suitable means.

Clostridium acetobutylicum (Weizmann) and certain other forms of butyl alcohol-acetone-forming organisms readily act upon carbohydrates. Still other organisms forming these products require that the carbohydrates or proteins be previously hydrolyzed before they are able to satisfactorily carry out the desired fermentation process. When a carbohydrate such as maize, wheat or other cereal is used as the raw material, as a rule, sufficient nitrogenous and other required nutrient materials are present to insure a satisfactory fermentation. However, when other carbohydrates such as cassava or saccharine materials such as black strap molasses, "Hydrol", wood sugars or pure sugars are used, satisfactory results are usually not obtained without the addition of nutrient materials. For this reason, in order to obtain uniform results, it is customary when fermenting saccharine materials to use the latter with a major portion of maize meal or of similar material which contains a sufficient quantity of naturally occurring nutrient material to enable the entire body of material to be fermented.

I have now found that a more complete utilization of carbohydrate materials such as maize, wheat, oats, etc., may be obtained if these materials are subjected to a preliminary treatment which apparently converts a portion of the carbohydrate into a form more readily acted upon by the bacteria, the operation being carried out in such a manner as not to require any separation or losses of the valuable raw materials. In a process of this character where the cost of the raw material is such an important factor, the small but relatively important saving effected by my new process marks an important step forward in the industry.

I am aware of the fact that in the past it has been suggested that the starch of maize be converted entirely into maltose and dextrose by treating the former with diastase obtained by soaking or steeping the hull or bran of such cereals. According to the concept of my invention, however, it is neither necessary nor desirable that the carbohydrate be converted entirely into saccharine material. My process of effecting the desired degree of conversion is also much more simple and requires less supervision and care than in the case of previously disclosed processes.

In carrying out my new process I prefer to proceed somewhat as disclosed below, but it is distinctly understood, however, that the method described is cited only as an example, and that my invention is intended to cover the various modifications that would naturally occur to one skilled in the art. The raw material to be used in the fermentation—such as maize—is placed in a suitable vessel, covered with water and allowed to steep or soak at a temperature ranging say from 45° C. to approximately 75° C. for a length of time depending upon the material employed, the form in which the material is steeped, the particular treatment to which the material is later to be subjected, and other factors. It is generally preferred to steep the material for a period of 48 hours and at a temperature of approximately 60° C. During the course of this steeping process some action or actions, the exact character of which I am not certain, take place with the result that when the material is later subjected to fermentation somewhat higher yields are obtained than from similar material which has not been treated in this manner. There is a possibility that this beneficial effect may be due to the conversion of a portion of the pentosans, hemicellulose and starch into a form more easily or more completely acted upon by the micro-organisms. Still another possibility is that there may be a slight hydrolysis of the proteins resulting in the fermentation of a more effective nutrient material. According to still another theory, the beneficial effects may be due largely to a more effective breaking down of the cell structure than that which occurs in cooking.

The procedure to be employed in following out my process may be varied considerably without leaving the concept of my invention. For example, the whole grains of maize may be steeped and then subjected to the usual methods of degermination. Or, the material after steeping may be ground and used without removing the germ. If preferred the material may first be ground and the meal thus obtained subjected to the steeping operation, either with or without removal of the germ.

Whatever preliminary treatment is made use of, the material at the conclusion of the steeping process is converted into a coarse meal, made up into a mash of approximately 5%–9% concentration by weight with water, thoroughly sterilized, cooled to approximately 97° F., inoculated with a culture of *clostridium acetobutylicum* (Weizmann) or other butyl alcohol-acetone-forming organism, and allowed to ferment at about 97° F. The solvents formed may then be recovered by the customary methods. Normal butyl alcohol, acetone and ethyl alcohol are produced in approximately the ratios of 6:3:1. In making up the mash it is possible also to substitute for a part or all of the water the steep water obtained as previously described.

In the table which follows, data are given showing the results obtained when carrying out my process under slightly different conditions.

Table I

| No. | Material | Conditions of steeping | | Yield of solvents on dry basis | | Percent increased yield |
|---|---|---|---|---|---|---|
| | | Time | Temperature | Steeped | Unsteeped | |
| | | | °C. | Per cent | Per cent | |
| 1 | Whole maize | 48 | 60 | 27.5 | 26.3 | 1.3 |
| 2 | Whole maize | 48 | 60 | 28.2 | 27.2 | 1.0 |
| 3 | Whole maize | 48 | 60 | 26.8 | 25.9 | 0.9 |
| 4 | Maize meal | 24 | 60 | 26.6 | 24.0 | 2.6 |
| 5 | Whole maize | 48 | 45 | 26.9 | 26.1 | 0.8 |
| 6 | Whole maize | 48 | 60 | 26.5 | 26.1 | 0.4 |
| 7 | Whole maize | 48 | 75 | 26.7 | 26.1 | 0.6 |
| 8 | Degerminated maize meal | 48 | 60 | 27.8 | 27.0 | 0.8 |

In carrying out my new process, it is distinctly understood that I do not restrict myself to the conditions outlined above but desire to claim broadly the process of water-steeping cereals previous to subjecting them to butyl alcohol-acetone fermentation. For instance, instead of using maize as in the above-described series of examples, I may use other cereals such as wheat, oats, barley, kaffir corn, etc. The length of steeping time may also be varied somewhat both above and below the limits disclosed in the table above but I have found that in most cases the optimum commercial results are obtained by steeping for 24–48 hours. Longer periods of time increase the cost of the final products somewhat due to the length of time the material is in process. Also, if the material is to be later degerminated, greater difficulty is experienced if the material is steeped too long. As has been previously indicated, the temperature at which the steeping may be effected may be varied over a fairly wide range. While temperatures both below and above the range specified above may be employed, I prefer to operate within this range. Steeping at temperatures appreciably below 45° C. leads to the incubation of undesirable types of organisms which thrive at such temperatures, and consume a portion of the valuable constituents of the raw material being treated. Temperatures higher than those specified are as a rule not desirable due to the increased costs of attaining them, altho it is possible to use temperatures as high as 100° C. with a fair degree of success. While I have only described the use of *Clostridium acetobutylicum* (Weizmann), it is distinctly understood that my improved process applies equally well to other organisms which have been recommended for the production of butyl alcohol and acetone, such as *B. butyl-aceticum, B-butylicum B. F., B. granulobacter pectinovorum*, etc.

Now having described my invention, what I claim is:

1. A fermentation process which comprises water-steeping substantially starchy carbohydrate-containing material at temperatures ranging from about 45° to about 75° C. for 24 to 48 hours, sterilizing the mash produced from said water-steeped carbohydrate material, inoculating said mash with butyl-acetonic bacilli, allowing fermentation to proceed, and recovering normal butyl alcohol, acetone and ethyl alcohol from the fermented mash.

2. A fermentation process which consists in water-steeping substantially starchy carbohydrate-containing materials at temperatures ranging from about 45° to about 75° C. for 24 to 48 hours, sterilizing a mash produced from said water-steeped carbohydrate material, inoculating the mash with butyl-acetonic bacilli, allowing fermentation to proceed, and recovering n-butyl alcohol, acetone and ethyl alcohol from the fermented mash.

3. A fermentation process which consists in water-steeping maize at a temperature ranging from about 45° to about 75° C. for 24 to 48 hours, sterilizing the mash produced from said water-steeped maize, inoculating the mash with butyl-acetonic bacilli, allowing fermentation to proceed, and recovering n-butyl alcohol, acetone and ethyl alcohol from the fermented mash.

4. A fermentation process which consists in water-steeping maize meal at temperatures ranging from about 45° to about 75° C. for 24 to 48 hours, sterilizing the mash produced from said water-steeped maize meal, inoculating the mash with butyl-acetonic bacilli, allowing fermentation to proceed, and recovering n-butyl alcohol, acetone and ethyl alcohol from the fermented mash.

5. A fermentation process which consists in water-steeping degerminated maize at temperatures ranging from about 45° to about 75° C. for 24 to 48 hours, sterilizing the mash produced from said water-steeped degerminated maize, inoculating the mash with butyl-acetonic bacilli, allowing fermentation to proceed, and recovering n-butyl alcohol, acetone and ethyl alcohol from the fermented mash.

6. In a process for the production of n-butyl alcohol, acetone and ethyl alcohol, the step which comprises water-steeping suitable substantially starchy carbohydrate-containing material at temperatures below 100° C. but in excess of normal atmospheric temperatures for 24 to 48 hours previous to inoculating with butyl-acetonic bacilli the mash prepared from said material.

7. In a process for the production of n-butyl alcohol, acetone and ethyl alcohol, the step which comprises water-steeping maize at temperatures below 100° C. but in excess of normal atmospheric temperatures for 24 to 48 hours previous to inoculating with butyl-acetonic bacilli the mash prepared from said material.

8. In a process for the production of n-butyl alcohol, acetone and ethyl alcohol, the step which comprises water-steeping maize meal at temperatures below 100° C. but in excess of normal atmospheric temperatures for 24 to 48 hours previous to inoculating with butyl-acetonic bacilli the mash prepared from said material.

9. In a process for the production of n-butyl alcohol, acetone and ethyl alcohol, the step which comprises water-steeping degerminated maize meal at temperatures below 100° C. but in excess of normal atmospheric temperatures for 24 to 48 hours previous to sterilizing and inoculating with butyl-acetonic bacilli the mash prepared from said material.

10. A fermentation process which comprises heating substantially starchy carbohydrate-containing material for 24-48 hours in an aqueous medium at temperatures between atmospheric and 100° C., sterilizing the mash thus produced, inoculating said mash with butyl-acetonic bacilli, allowing fermentation to proceed, and recovering normal butyl alcohol, acetone and ethyl alcohol from the fermented mash.

11. A fermentation process which comprises heating substantially starchy carbohydrate-containing material for 24-48 hours in an aqueous medium at temperatures from 45-75° C., sterilizing the mash thus produced, inoculating said mash with butyl-acetonic bacilli, allowing fermentation to proceed, and recovering normal butyl alcohol, acetone and ethyl alcohol from the fermented mash.

DAVID ALLISTON LEGG.